(12) United States Patent
Kambe

(10) Patent No.: US 10,280,612 B2
(45) Date of Patent: May 7, 2019

(54) VENTILATION STRUCTURE

(71) Applicant: HAUSECO CO., LTD., Osaka-shi, Osaka (JP)

(72) Inventor: Mutsuhito Kambe, Osaka (JP)

(73) Assignee: HAUSECO CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 15/841,839

(22) Filed: Dec. 14, 2017

(65) Prior Publication Data

US 2018/0179753 A1 Jun. 28, 2018

(30) Foreign Application Priority Data

Dec. 26, 2016 (JP) .................. 2016-251583

(51) Int. Cl.
*E04B 1/70* (2006.01)
*E04C 2/52* (2006.01)
(Continued)

(52) U.S. Cl.
CPC ............ *E04B 1/7076* (2013.01); *E04D 13/17* (2013.01); *A01M 1/24* (2013.01); *E04C 2/523* (2013.01);
(Continued)

(58) Field of Classification Search
CPC ... E04B 1/7076; E04B 1/7069; E04D 13/152; E04D 13/0459; F24F 2007/003; F24F 2007/004; E04C 2/523; A01M 1/24
(Continued)

(56) References Cited

U.S. PATENT DOCUMENTS 2,645,824 A * 7/1953 Titsworth ............... E04B 1/7069
220/592.01
2,803,185 A * 8/1957 Coleman ............... F24F 13/068
454/280
(Continued)

FOREIGN PATENT DOCUMENTS

DE 2520441 A * 11/1976
GB 2169071 A * 7/1986 ........... E04B 1/7069
(Continued)

*Primary Examiner* — Robert Canfield
*Assistant Examiner* — Matthew J Gitlin
(74) *Attorney, Agent, or Firm* — Rabin & Berdo, P.C.

(57) ABSTRACT

A ventilation structure is set on a parting portion between an outer wall member and an eave member, and extends in a longitudinal direction along the parting portion. The ventilation structure includes an outer wall base member, the outer wall member provided on the outer wall base member through a furring strip, the eave member provided upward beyond the outer wall member and an upper end of the furring strip, and a ventilation member set in a space between the outer wall base member, the furring strip, the outer wall member and the eave member for ventilating an aeration layer between the outer wall base member and the outer wall member and an exterior. The ventilation member is constituted of a frame member and an aeration member set on the frame member. The frame member includes a first vertical portion, a top surface portion, a second vertical portion and a bottom surface portion. The aeration member includes a plurality of vent holes passing through the same from an outer surface to an inner surface.

11 Claims, 12 Drawing Sheets

(51) Int. Cl.
*E04D 13/17* (2006.01)
*F24F 7/00* (2006.01)
*A01M 1/24* (2006.01)

(52) U.S. Cl.
CPC ... *F24F 2007/003* (2013.01); *F24F 2007/004* (2013.01)

(58) Field of Classification Search
USPC .... 52/95, 96, 101, 198, 302.1, 302.3, 302.6, 52/407.1
See application file for complete search history.

(56) References Cited

U.S. PATENT DOCUMENTS

| | | | | |
|---|---|---|---|---|
| 3,343,323 A | * | 9/1967 | Mayfield | E04B 1/7076 454/254 |
| 4,762,053 A | * | 8/1988 | Wolfert | E04D 13/152 454/260 |
| 4,807,409 A | * | 2/1989 | Sells | E04D 13/152 454/260 |
| 5,007,196 A | * | 4/1991 | Saunders | A01M 1/223 43/112 |
| 5,035,172 A | * | 7/1991 | Waggoner | E04D 13/152 454/260 |
| 6,052,959 A | * | 4/2000 | LaBrosse | E04B 1/7076 248/48.1 |
| 2003/0159379 A1 | * | 8/2003 | Pickler | E04D 13/0459 52/283 |
| 2017/0073964 A1 | * | 3/2017 | Collins | E04B 1/7038 |
| 2017/0356188 A1 | * | 12/2017 | Stone | E04C 1/39 |

FOREIGN PATENT DOCUMENTS

| | | | | |
|---|---|---|---|---|
| GB | 2497179 A | * | 6/2013 | ............ F24F 7/02 |
| JP | 2610342 B2 | | 5/1997 | |
| JP | 2014-31640 A | | 2/2014 | |
| JP | 2016-070044 A | | 5/2016 | |
| SE | 537410 C2 | * | 8/2013 | ............ E04B 1/70 |

* cited by examiner

VENTILATION STRUCTURE

BACKGROUND OF THE INVENTION

Field of the Invention

The present invention relates to a ventilation structure, and more particularly, it relates to a ventilation structure provided on a parting portion between an eave and a wall surface.

Description of the Background Art

Various techniques for ventilating portions of a building have been proposed in general. For example, Japanese Patent Laying-Open No. 2014-31640 discloses an eave ventilation structure, having an L-shaped section, constituted of an eave member formed by press-working a steel plate and a ventilation member of synthetic resin mounted in the eave member. More specifically, Japanese Patent Laying-Open No. 2014-31640 discloses that the eave ventilation structure is mounted on a gable and an end wall member with screws or the like to cover a space provided between a lower end portion of the gable and an upper end portion of the end wall member.

Japanese Patent Laying-Open No. 2016-70044 discloses an aeration structure having an outer wall aeration layer provided between an outer wall base member and an outer wall member for introducing air thereinto from a sill portion of a building and moving the introduced air to an upper portion of the building therethrough.

PRIOR ART

Patent Document

Patent Document 1: Japanese Patent Laying-Open No. 2014-31640
Patent Document 2: Japanese Patent Laying-Open No. 2016-70044

SUMMARY OF THE INVENTION

Problems to be Solved by the Invention

On a practical building site, however, an eave ventilation structure provided with no ventilation member such as that described in "Description of the Background Art" of Patent Document 1 may be employed. In this case, rainwater may penetrate into the building from a ventilation member provided on an eaves soffit under an environment wind- and rain-swept from below. In particular, a building constructed on a sheer terrace zone along a coastline tends to be exposed to such an environment. When such a ventilation member is provided close to a wall surface, the same is strongly swept by wind and rain colliding with the wall surface and ascending, further leading to penetration of rainwater.

According to Patent Document 2, on the other hand, moist air moves from the sill portion to the upper portion of the building through the outer wall aeration layer, as described above. If the moist air reaches an attic, the attic is disadvantageously filled with moisture. Therefore, a ventilation structure capable of discharging such moist air outward before reaching an attic portion has been awaited.

The present invention has been proposed in order to solve the aforementioned problems, and aims at providing a ventilation structure capable of reducing penetration of rainwater caused by wind-sweeping from below and preventing moistening of an attic portion.

In order to attain the aforementioned object, a ventilation structure according to a first aspect of the present invention is a ventilation structure set on a parting portion between an outer wall member and an eave member to extend in a longitudinal direction along the parting portion, and includes an outer wall base member, the outer wall member provided on the outer wall base member through a furring strip, the eave member provided upward beyond the outer wall member and an upper end of the furring strip and a ventilation member set in a space between the outer wall base member, the furring strip, the outer wall member and the eave member for ventilating an aeration layer between the outer wall base member and the outer wall member and the exterior, while the ventilation member is constituted of a frame member and an aeration member set on the frame member, the frame member includes a first vertical portion continuously extending in the longitudinal direction while extending in a vertical direction along the outer wall base member, a top surface portion connected to an upper end side of the first vertical portion to extend outward up to a line of an outer surface of the outer wall member, a second vertical portion connected to an outer side of the top surface portion to extend vertically downward and provided with a plurality of openings at prescribed intervals in the longitudinal direction and a bottom surface portion connected to a lower end side of the second vertical portion to extend toward the direction of the first vertical portion while leaving a prescribed distance, and the aeration member is mounted to be covered between an inner surface of the top surface portion and an inner surface of the bottom surface portion and provided with a plurality of vent holes facing at least the openings and passing through the aeration member from an outer surface to an inner surface.

According to this structure, a ventilation structure for an eave parting portion having opening portions flush with an outer wall member is obtained.

In a ventilation structure according to a second aspect of the present invention, the eave member is so set as to extend in a horizontal direction in the structure of the invention according to the first aspect.

According to this structure, a ventilation structure for an eave parting portion having opening portions flush with an outer wall member is obtained in a horizontal eave structure.

In a ventilation structure according to a third aspect of the present invention, the eave member is set to incline downward in the structure of the invention according to the first aspect.

According to this structure, a ventilation structure for an eave parting portion having opening portions flush with an outer wall member is obtained in an incliningly provided eave structure.

In a ventilation structure according to a fourth aspect of the present invention, the top surface portion incliningly extends along the eave member in the structure of the invention according to the third aspect.

According to this structure, the ventilation structure has a shape fitting an incliningly provided eave.

In a ventilation structure according to a fifth aspect of the present invention, the frame member further includes an extensional portion extending outward from a connected portion between the top surface portion and the second vertical portion and a third vertical portion connected to an outer side of the extensional portion to extend downward for at least partially covering the openings in the structure of the invention according to any one of the first to fourth aspects.

According to this structure, the ventilation structure can prevent the openings from rainwater penetrating thereinto along an eave.

A ventilation member according to a sixth aspect of the present invention is a ventilation member set in a ventilation constitution for a parting portion between an outer wall and an eave to extend in a longitudinal direction along the parting portion and constituted of a frame member and an aeration member set on the frame member, while the frame member includes a first vertical portion continuously extending in the longitudinal direction while extending in a first direction corresponding to a vertical direction at the time of setting in the ventilation constitution, a top surface portion connected to an upper end side of the first vertical portion to extend in a second direction with a size reaching a line of an outer surface of the outer wall at the time of setting in the ventilation constitution, a second vertical portion connected to a side of the top surface portion in the second direction to extend vertically downward and provided with a plurality of openings at prescribed intervals in the longitudinal direction, a bottom surface portion connected to a lower end side of the second vertical portion to extend toward the direction of the first vertical portion while leaving a prescribed distance, an extensional portion extending in the second direction from a connected portion between the top surface portion and the second vertical portion and a third vertical portion connected to an outer side of the extensional portion to extend vertically downward for at least partially covering the openings, and the aeration member has an outer surface provided on the side of the openings and an inner surface provided on the side of the first vertical portion, is mounted to be covered between an inner surface of the top surface portion and an inner surface of the bottom surface portion, and has a plurality of vent holes facing at least the openings and passing through the aeration member from the outer surface to the inner surface.

According to this structure, the openings are flush with the outer wall member and can be prevented from rainwater penetrating thereinto along the eave when the ventilation portion is set in the ventilation structure for the parting portion between the outer wall and the eave.

Effects of the Invention

As hereinabove described, the ventilation structure according to the first aspect of the present invention provides a ventilation constitution for the eave parting portion having opening portions flush with the outer wall member, whereby penetration of rainwater caused by wind-sweeping from below can be reduced while an attic portion can be prevented from moistening.

The ventilation structure according to the second aspect of the present invention provides a ventilation constitution for the eave parting portion having opening portions flush with the outer wall member in a horizontal eave structure in addition to the effect of the invention according to the first aspect, whereby a ventilation constitution performing ventilation while preventing penetration of rainwater caused by wind-sweeping from below is obtained in the horizontal eave structure.

The ventilation structure according to the third aspect of the present invention provides a ventilation constitution for the eave parting portion having opening portions flush with the outer wall member in an incliningly provided eave structure in addition to the effect of the invention according to the first aspect, whereby a ventilation constitution performing ventilation while preventing penetration of rainwater caused by wind-sweeping from below is obtained in the incliningly provided eave structure.

The ventilation structure according to the fourth aspect of the present invention has a shape fitting an incliningly provided eave in addition to the effect of the invention according to the third aspect, whereby a clearance between the eave member and the outer wall base member can be reduced.

The ventilation structure according to the fifth aspect of the present invention can prevent the openings from rainwater penetrating thereinto along the eave in addition to the effect of the invention according to any one of the first to fourth aspects, whereby the effect of preventing penetration of rainwater can be improved.

The ventilation member according to the sixth aspect of the present invention is so formed that the opening portions are flush with the outer wall member and can be prevented from rainwater penetrating thereinto along the eave when the ventilation member is set in the ventilation structure for the parting portion between the outer wall and the eave. Thus, the ventilation member can reduce penetration of rainwater caused by wind-sweeping from below and improve the effect of preventing penetration of rainwater when the same is set in the ventilation structure for the parting portion between the outer wall and the eave.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
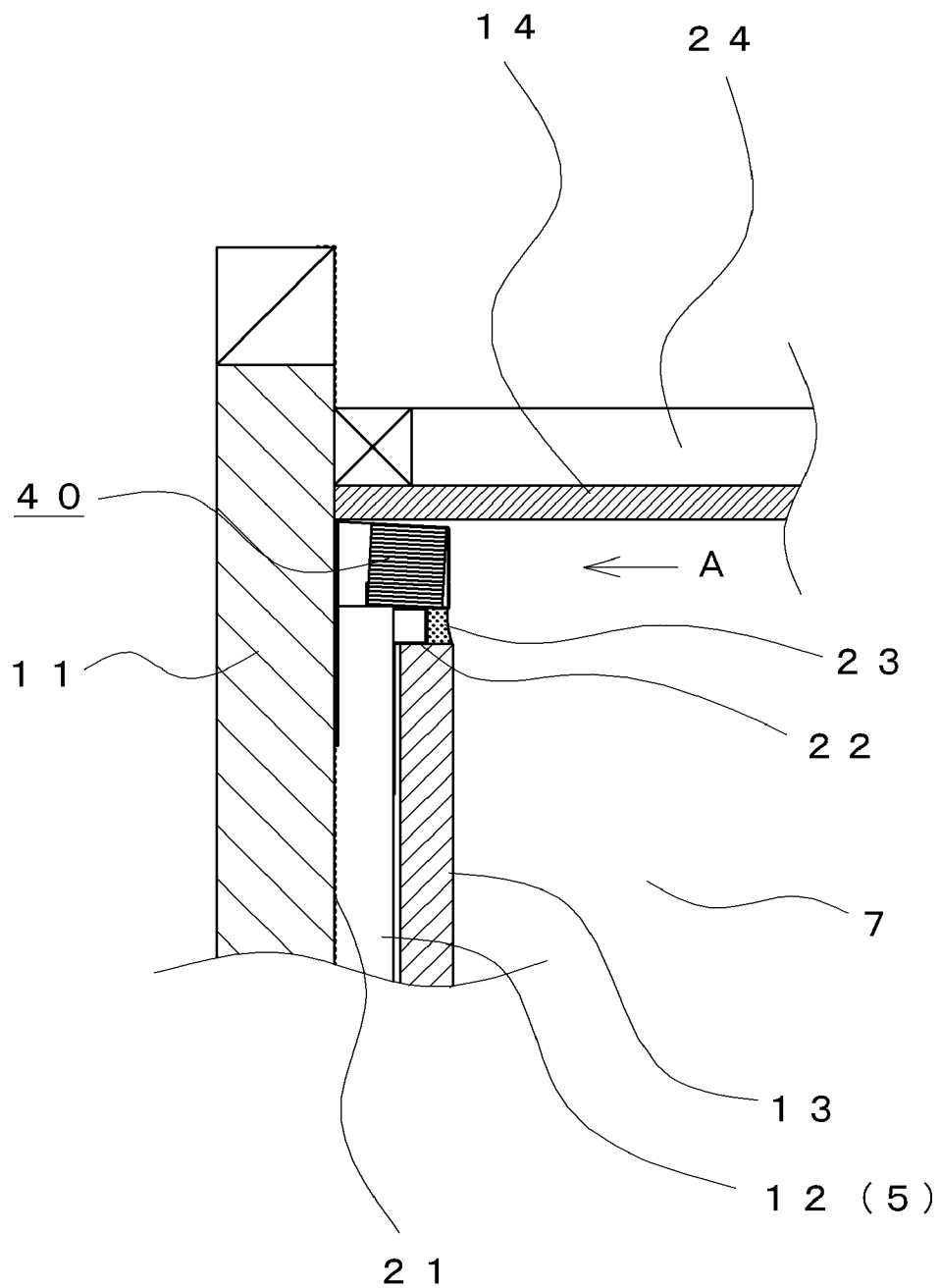
FIG. 1 is a detail drawing of a ventilation structure according to a first embodiment of the present invention.
Figure 2:
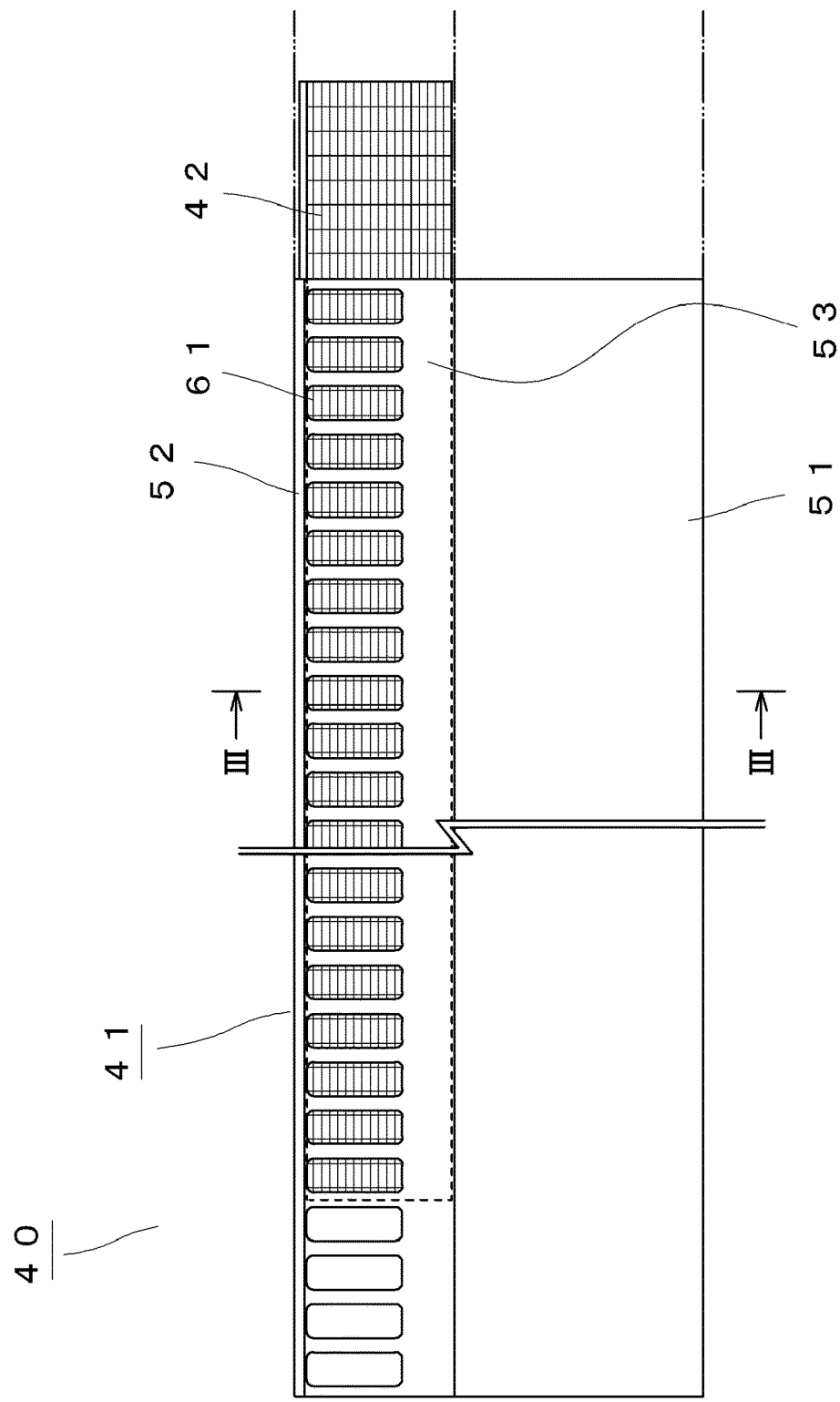
FIG. 2 is a front elevational view showing the appearance of a ventilation member provided on the ventilation structure shown in FIG. 1, as viewed along arrow A shown in FIG. 1.
Figure 3:
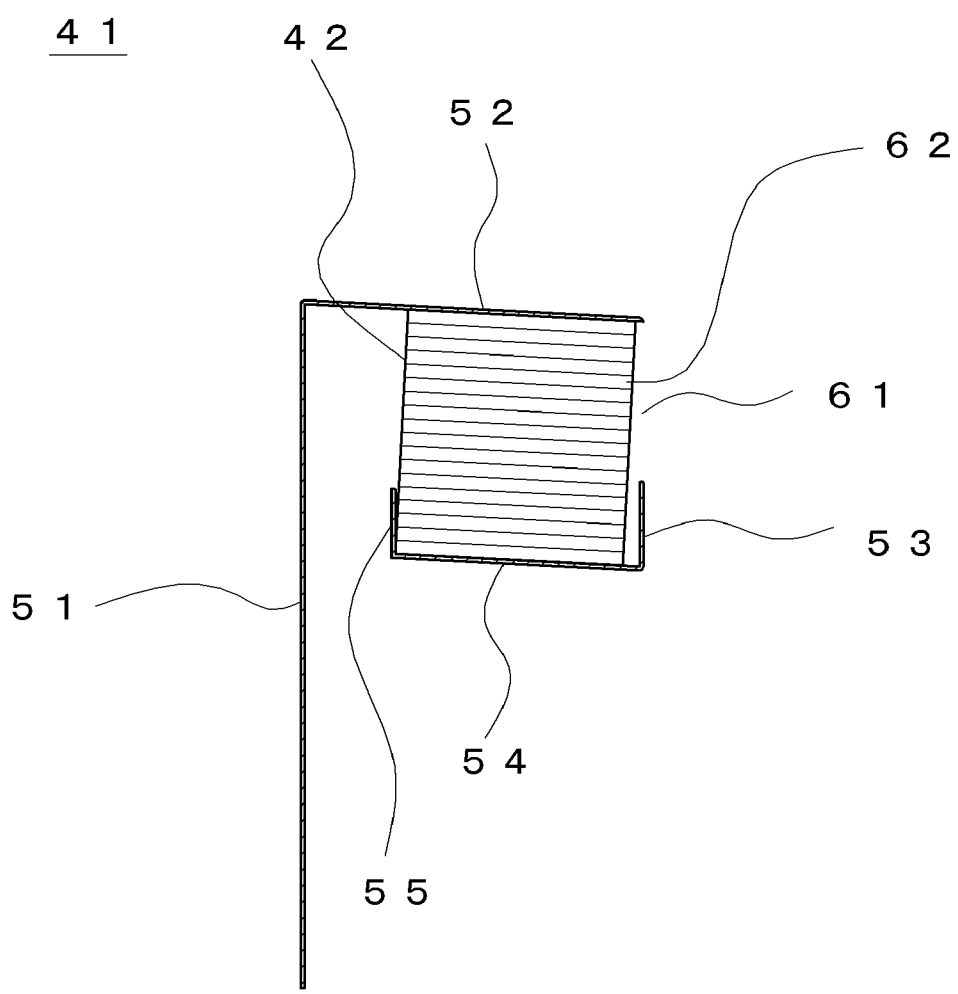
FIG. 3 is an enlarged sectional view taken along a line III-III shown in FIG. 2.

FIG. 1 is a detail drawing of a ventilation structure 1 according to a first embodiment of the present invention, FIG. 2 is a front elevational view showing the appearance of a ventilation member 40 provided on the ventilation structure 1 shown in FIG. 1 as viewed along arrow A shown in FIG. 1, and FIG. 3 is an enlarged sectional view taken along a line III-III shown in FIG. 2.

Referring to FIGS. 1 to 3, the ventilation structure 1 is set on a parting portion between an outer wall member 13 and an eave member 14 to extend in a longitudinal direction along the parting portion, and includes an outer wall base member 11, the outer wall member 13 provided on the outer wall base member 11 through furring strips 12, the eave member 14 so provided as to extend in a horizontal direction upwardly beyond the outer wall member 13 and upper ends of the furring strips 12, and the ventilation member 40 set in a space between the outer wall base member 11, the furring strips 12, the outer wall member 13 and the eave member 14 for ventilating an aeration layer 5 between the outer wall base member 11 and the outer wall member 13 and an exterior 7.

The ventilation member 40 is constituted of a frame member 41 formed by press-working a steel plate and an aeration member 42 set in the frame member 41.

The frame member 41 includes a first vertical portion 51 continuously extending in the vertical direction while extending in a vertical direction along the outer wall base member 11, a top surface portion 52 connected to an upper end side of the first vertical portion 51 to extend outward up to a line of an outer surface of the outer wall member 13, a second vertical portion 53 connected to an outer side of the top surface portion 52 to extend vertically downward and provided with a plurality of openings 61 at prescribed intervals in the longitudinal direction, and a bottom surface portion 54 connected to a lower end side of the second vertical portion 53 to extend toward the direction of the first vertical portion 51 while leaving a prescribed distance.

Connection between the first vertical portion 51 and the top surface portion 52 is so set that the top surface portion 52 inclines downward by 2 to 3° beyond a horizontal plane. Connection between the second vertical portion 53 and the bottom surface portion 54 is so set that the bottom surface portion 54 inclines upward by 2 to 3° beyond a horizontal plane. Thus, the top surface portion 52 and the bottom surface portion 54 are substantially parallelly arranged. A draining 55 extending upward slightly toward the side of the first vertical portion 52 is formed on an inner side of the bottom surface portion 54.

The aeration member 42 is provided in the form of a bar having a rectangular section in a short-side direction and extending in the longitudinal direction. The aeration member 42 is mounted to be covered between inner surfaces of the top surface portion 52 and a bottom surface portion 54 with an adhesive or a double-sided adhesive tape, and has a plurality of vent holes 62 facing the openings 61 and passing through the aeration member 42 from an outer surface to an inner surface. A space is provided between the outer surface of the aeration member 42 and the inner surface of the second vertical portion 53.

As shown in FIG. 3, the aeration member 42 is so mounted on the frame member 41 as to protrude from one end of the frame member 41 and to dent from another end thereof in the longitudinal direction.

The detailed structure and effects of the aeration member 42 are now described.

Figure 4:
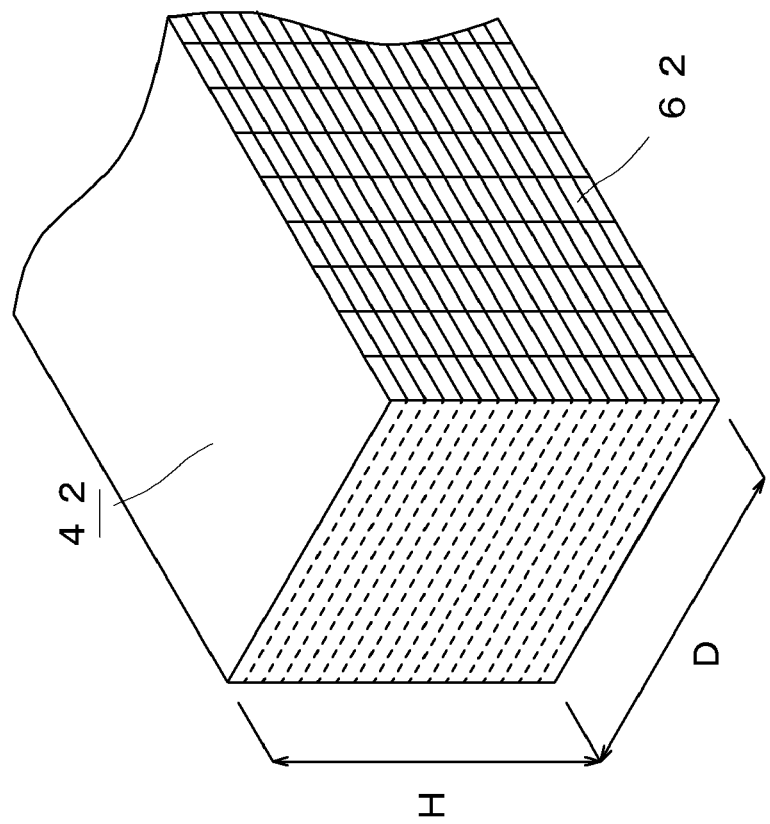
FIG. 4 is a schematic perspective view showing the appearance of the ventilation member shown in FIG. 2.

FIG. 4 is a schematic perspective view showing the appearance of the aeration member 42 shown in FIG. 2.

Referring to FIG. 4, the aeration member 42 is provided in the form of a bar having a rectangular section in the short-side direction as described above and having a length substantially identical to that of the frame member 41 in the longitudinal direction.

More specifically, the aeration member 42 is formed by stacking a plurality of synthetic resin sheets each having an irregular sectional shape, connecting the same with each other by heat sealing and integrating the same. Further, the aeration member 42 is provided with the large number of vent holes 62 passing through the same from one side surface (outer surface) to another side surface (inner surface). The vent holes 62 extend in a direction substantially parallel to the extensional direction of the top surface portion 52 and the bottom surface portion 54 of the frame member 41.

The length D of the rectangular section of the aeration member 42 in the short-side direction is set to 20 mm, and another length H corresponding to the height thereof is set to 19 mm. The rectangular vent holes 62 are set to have an opening size of about 1 mm by 4 mm. The aeration member 42 is basically identical in structure to a ridge cover member disclosed in Patent Document: Japanese Patent No. 2610342. Thus, the aeration member 42 enables ventilation through the vent holes 62 and exhibits ventilation and waterproof performances inhibiting penetration of rainwater, insects and the like through the vent holes 62 under constant conditions. The aeration member 42 is so used as to contribute to reduction of the weight of and the cost for the ventilation member 42.

As hereinabove described, the aeration member 42 is so mounted on the frame member 41 as to protrude from one end of the frame member 41 and to dent from another end thereof in the longitudinal direction. In a case of continuously setting a plurality of ventilation members 40 in the longitudinal direction, therefore, the protruding portion of the aeration member 42 of each ventilation member 40 may simply be inserted into the frame member 41 of the adjacent ventilation member 40 shown by two-dot chain lines in FIG. 2. Thus, the adjacent ventilation members 40 are so easily coupled with each other that the plurality of ventilation members 40 can be efficiently continuously mounted on each other. As both endmost ones of the plurality of ventilation members 40 coupled with each other in the longitudinal direction, a relatively long ventilation member 40 having an aeration member 42 mounted on the corresponding frame member 41 from a position protruding from one end up to another end thereof and a relatively short aeration member 42 mounted on the corresponding frame member 41 from one end up to a position denting from another end thereof may be used.

Thus, the ventilation member 40 shown in FIG. 2 etc. can be regarded as a member obtained by integrally combining the frame member 41 and the aeration member 42 exhibiting the ventilation and waterproof performances with each other.

Mounting steps of forming the ventilation structure 1 by mounting the ventilation member 40 on the parting portion are now described.

Referring again to FIGS. 1 to 3, a water-permeable waterproof sheet 21 is first set on an outer surface of the outer wall base member 11, the plurality of furring strips 12 are thereafter arranged on the outer surface of the outer wall base member 11 at the prescribed intervals in the longitudinal direction, and portions of the plurality of furring strips 12 excluding upper end portions thereof are mounted on the outer wall base member 11. Then, the first vertical portion 51 of the frame member 41 provided on the ventilation member 40 is set to be inserted into a clearance between the upper end portions of the furring strips 21 and the outer wall base member 11.

Thus, the ventilation member 40 can be so easily positioned on the outer wall base member 11 and the like that the mounting operation can be improved in efficiency.

Then, the upper end portions of the furring strips 12 are mounted on the outer wall base member 11, while the first vertical portion 51 of the ventilation member 40 is fixed to the outer wall base member 11 with nails between the furring strips 12.

Thereafter single hat joiners 22 consisting of steel plates and extending in the longitudinal direction are so fixed to the respective ones of the furring strips 12 with nails that upper surfaces of hat-shaped protrusions thereof come into contact with the bottom surface portion 54 of the frame member 41. Then, the outer wall member 13 is so mounted on the furring strips 12 through mounting fittings (not shown) that the upper end thereof comes into contact with lower surfaces of the hat-shaped protrusions of the single hat joiners 22.

Then, a space between a lower surface of the bottom surface portion 54 of the frame member 41, outer surfaces of the hat-shaped protrusions of the single hat joiners 22 and the upper end of the outer wall member 13 is filled with a caulking material 23. Thus, the single hat joiners 22 are so employed as to simplify application of the caulking material 23.

Thereafter a ceiling joist 24 is mounted on the outer wall base member 11, and the eave member 14 is mounted on the ceiling joist 24.

Figure 5:
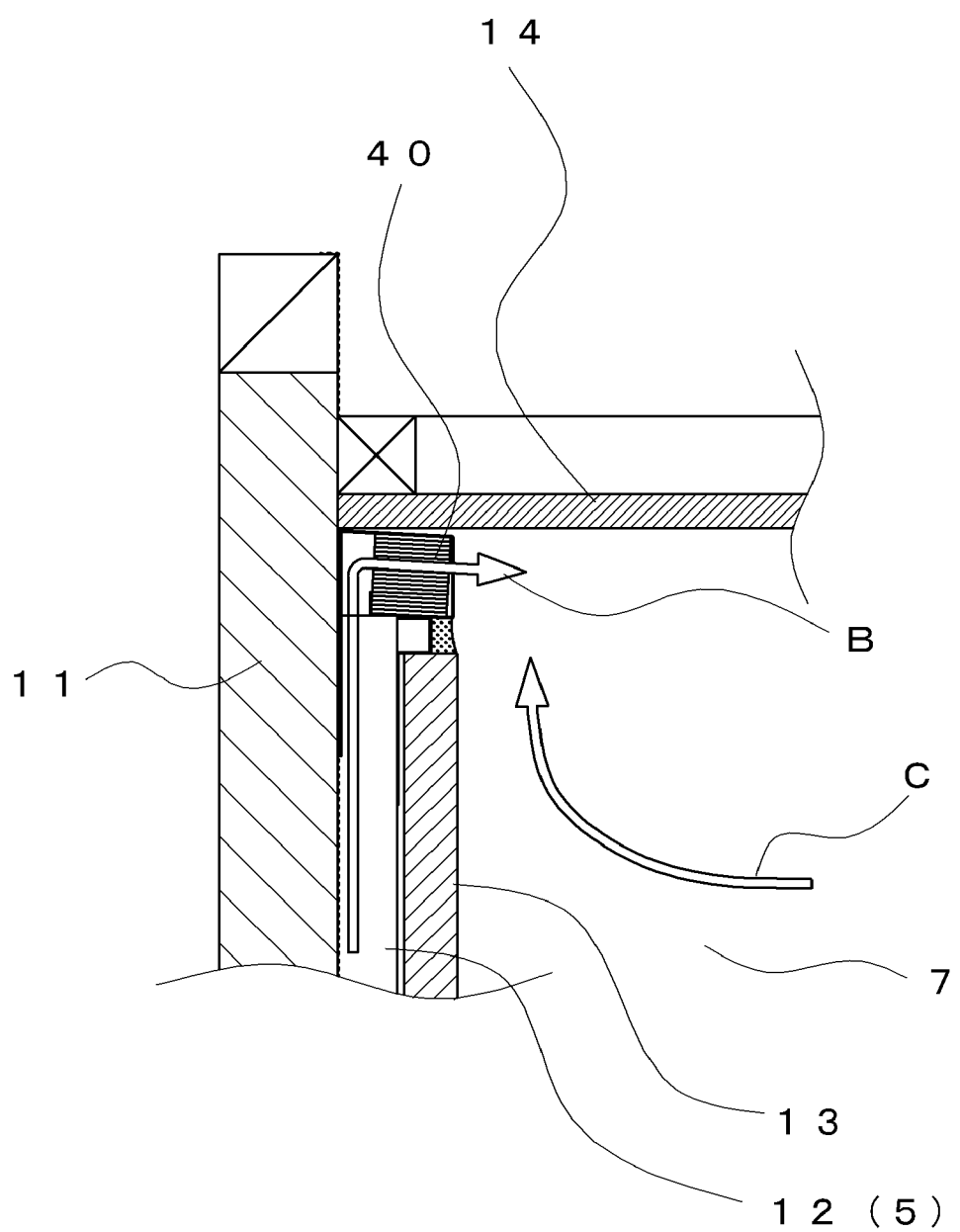
FIG. 5 illustrates an aeration structure of the ventilation structure shown in FIG. 1.

FIG. 5 illustrates an aeration structure of the ventilation structure 1 shown in FIG. 1.

According to the ventilation structure 1 shown in above, the aeration layer 5 is formed between the outer wall base member 11 and the outer wall member 13. One side of the aeration layer 5 communicates with an air passage of another portion (a sill portion or the like) of a building (not shown). Another side of the aeration layer 5 communicates with the exterior 7 through the ventilation member 40.

Referring also to FIG. 3, air from another portion of the building moves to a space between the first vertical portion 51 and the bottom surface portion 54 of the frame member 41 through the aeration layer 5, and passes outward through the vent holes 62 of the aeration member 42, as shown by arrow B in FIG. 5. The air passing through the aeration member 42 moves toward the exterior 7 through the respective ones of the openings 61 of the second vertical portion 53. When external air penetrates into the building, the air flows oppositely to arrow B in FIG. 5.

Thus, according to the ventilation structure 1, air moving from another portion of the building may not be ventilated in an attic portion, whereby the attic portion can be prevented from moistening.

In a horizontal eave structure, the openings 61 are flush with the outer wall member 13 in the ventilation member 40. Thus, such a ventilation constitution for an eave parting portion is obtained that the openings 61 are flush with the external wall member 13, thereby reducing penetration of rainwater caused by wind-sweeping from below as shown by arrow C in FIG. 5.

As hereinabove described, a space is formed between the outer surface of the aeration member 42 and the inner surface of the second vertical portion 53 of the frame member 41. Further, the inner surface of the aeration member 42 slightly inclines with respect to the draining 55, whereby a small space is formed also around the draining 55. Therefore, the whole outer surface of the aeration member 42 is exposed while almost all the inner surface thereof is also exposed, whereby the most vent holes 62 can effectively exhibit aeration functions.

Even if rainwater is going to penetrate into the frame member 41 through the respective ones of the openings 61 of the second vertical portion 53 of the frame member 41 provided on the ventilation member 40, the rainwater penetrating into the frame member 41 cannot move inward through the vent holes 62 of the aeration member 42 under constant conditions, as described above.

As hereinabove described, the top surface portion 52 and the bottom surface portion 54 of the frame member 41 are arranged parallelly to each other and incline outward by 2 to 3°, while drain holes (not shown) are formed on a portion of the bottom surface portion 54 connected to the second vertical portion 53. Therefore, rainwater penetrating into the frame member 41 is naturally discharged from the drain holes along the inclination. Thus, the waterproof performance of the ventilation member 40 is improved.

The draining 55 extends upward as described above, whereby rainwater reaching the inner surface of the aeration member 42 hardly penetrates into the aeration layer 5. Then, the rainwater is discharged outward from the drain holes through the inclination of the draining 55 and the bottom surface portion 54. Thus, the waterproof performance of the ventilation member 40 is further improved.

Figure 6:
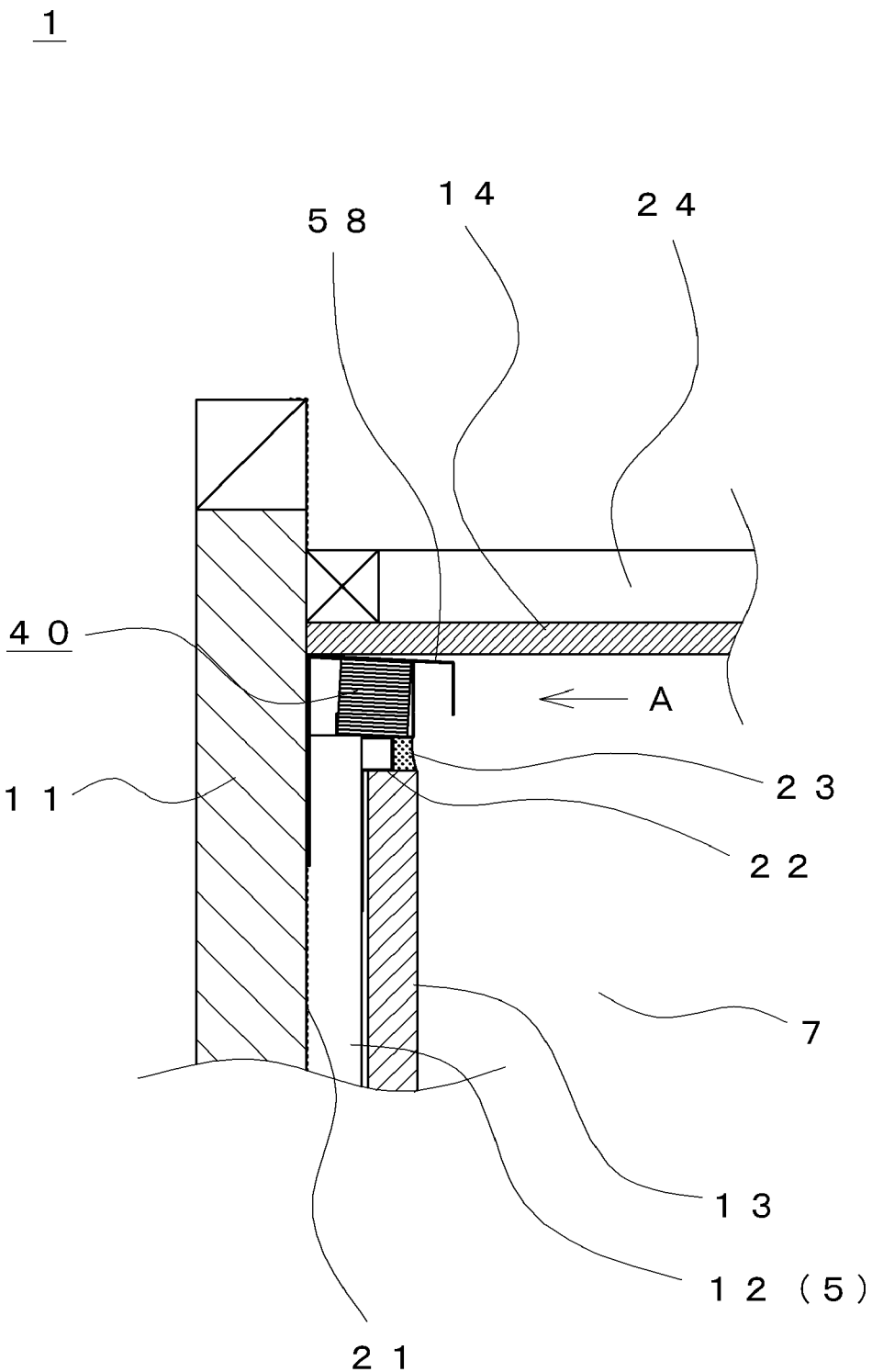
FIG. 6 is a detail drawing of a ventilation structure according to a second embodiment of the present invention, and corresponds to FIG. 1.
Figure 7:
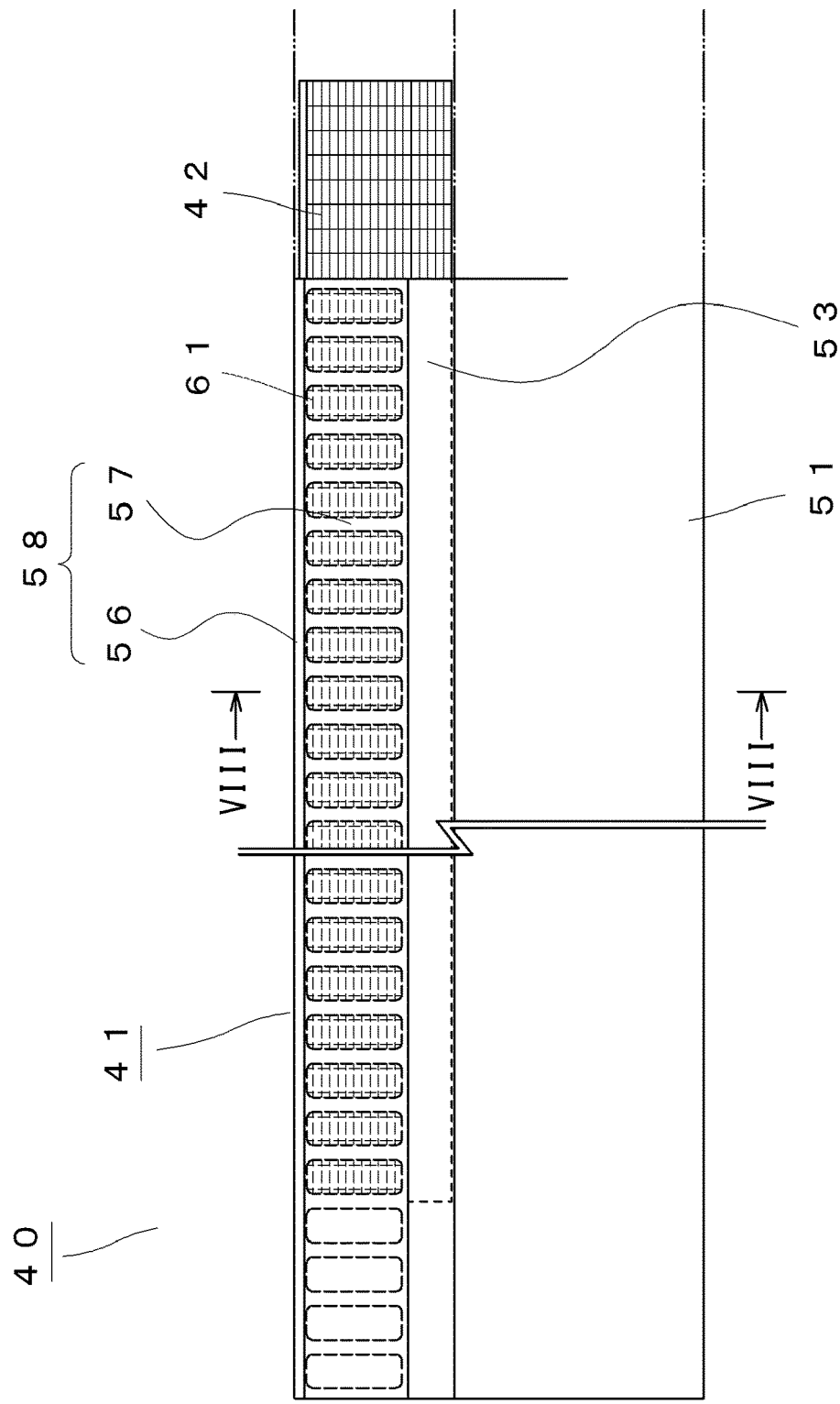
FIG. 7 is a front elevational view showing the appearance of a ventilation member provided on the ventilation structure shown in FIG. 6 as viewed along arrow A shown in FIG. 6.
Figure 8:
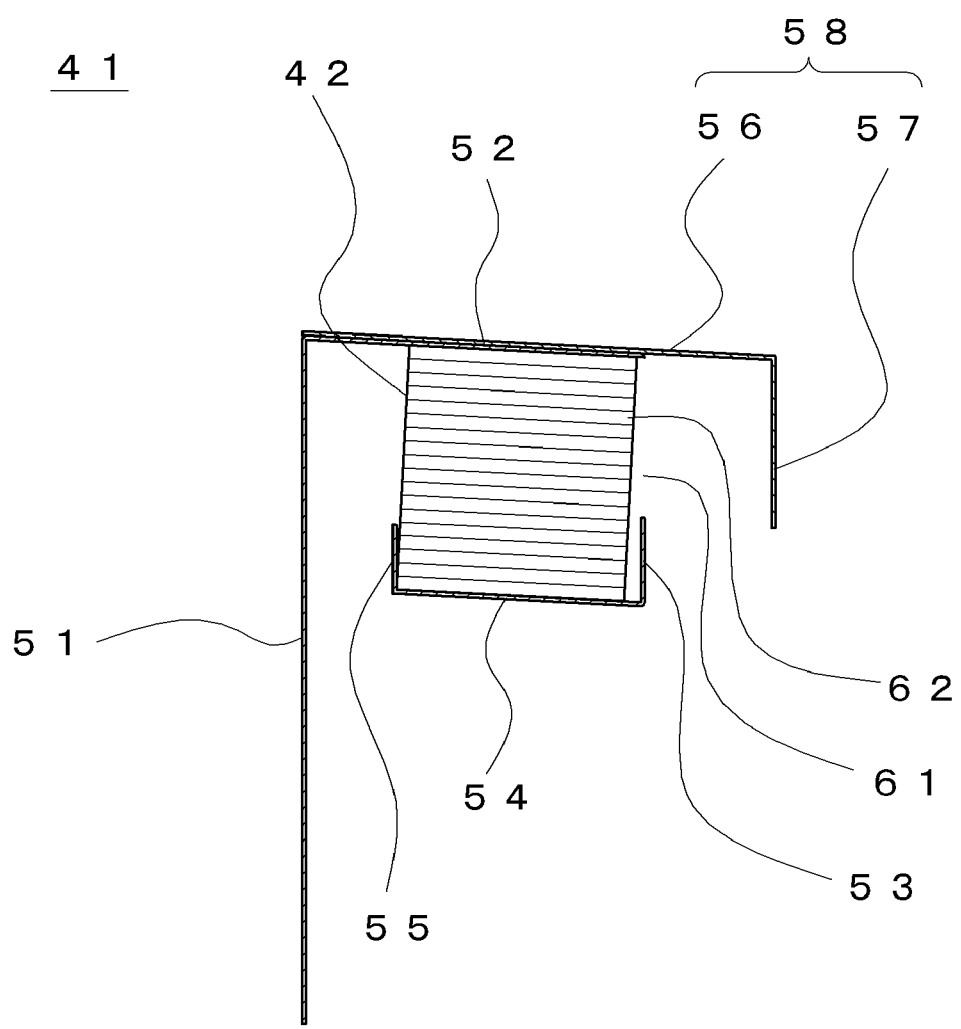
FIG. 8 is an enlarged sectional view taken along a line VIII-VIII shown in FIG. 7.

FIG. 6 is a detail drawing of a ventilation structure 1 according to a second embodiment of the present invention and corresponds to FIG. 1, FIG. 7 is a front elevational view showing the appearance of a ventilation member 40 provided on the ventilation structure 1 shown in FIG. 6 as viewed along arrow A shown in FIG. 6, and FIG. 8 is an enlarged sectional view taken along a line VIII-VIII shown in FIG. 7.

The ventilation structure 1 according to the second embodiment is basically identical to that according to the first embodiment, and hence the second embodiment is described with reference to points different from those of the first embodiment.

Referring to FIGS. 6 to 8, a frame member 41 provided on the ventilation member 40 further includes a hood member 58 in a structure similar to that according to the first embodiment.

The hood member 58 includes a mount portion 56 mounted on a top surface portion 52 with a double-sided adhesive tape or the like so that a part (an extending portion) thereof protrudingly extends outward from a connected portion between the top surface portion 52 and a second vertical portion 53 and a third vertical portion 57 connected to an outer side of the mount portion 56 to vertically extend downward for completely covering openings 61 in a horizontal direction.

According to this structure, the openings 61 can be prevented from rainwater penetrating thereinto along an eave. Thus, an effect of preventing penetration of rainwater can be improved.

Figure 9:
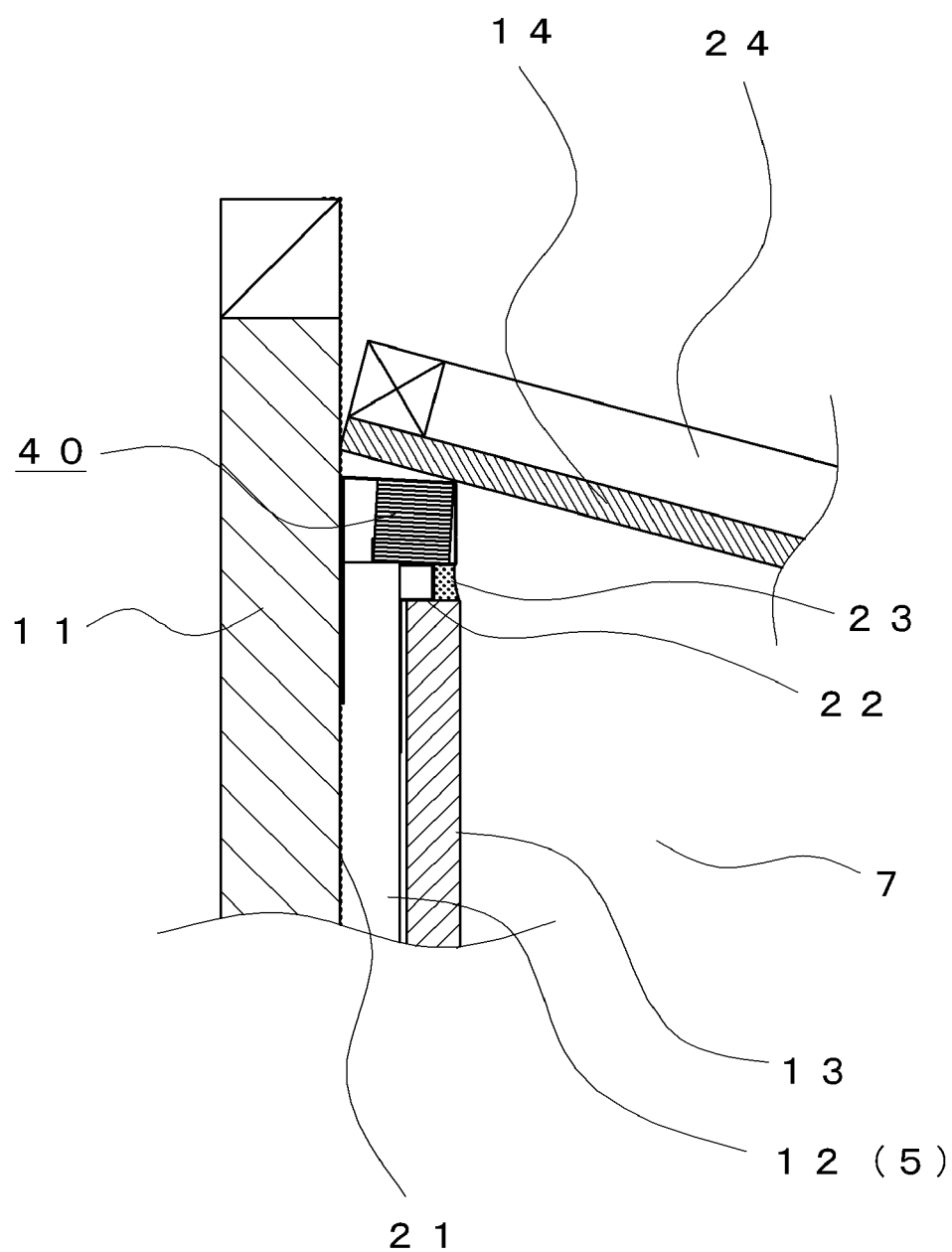
FIG. 9 is a detail drawing of a ventilation structure according to a third embodiment of the present invention, and corresponds to FIG. 1.

FIG. 9 is a detail drawing of a ventilation structure 1 according to a third embodiment of the present invention, and corresponds to FIG. 1.

The ventilation structure 1 according to the third embodiment is basically identical to that according to the first embodiment, and hence the third embodiment is described with reference to points different from those of the first embodiment.

Referring to FIG. 9, an eave member 14 inclines downward toward the exterior in the ventilation structure 1 according to the third embodiment.

In an incliningly provided eave structure, therefore, a ventilation constitution for an eave parting portion is so obtained that opening portions are flush with an outer wall member.

In the incliningly provided eave structure, therefore, the ventilation constitution is so obtained as to perform ventilation while preventing penetration of rainwater caused by wind-sweeping from below.

Figure 10:
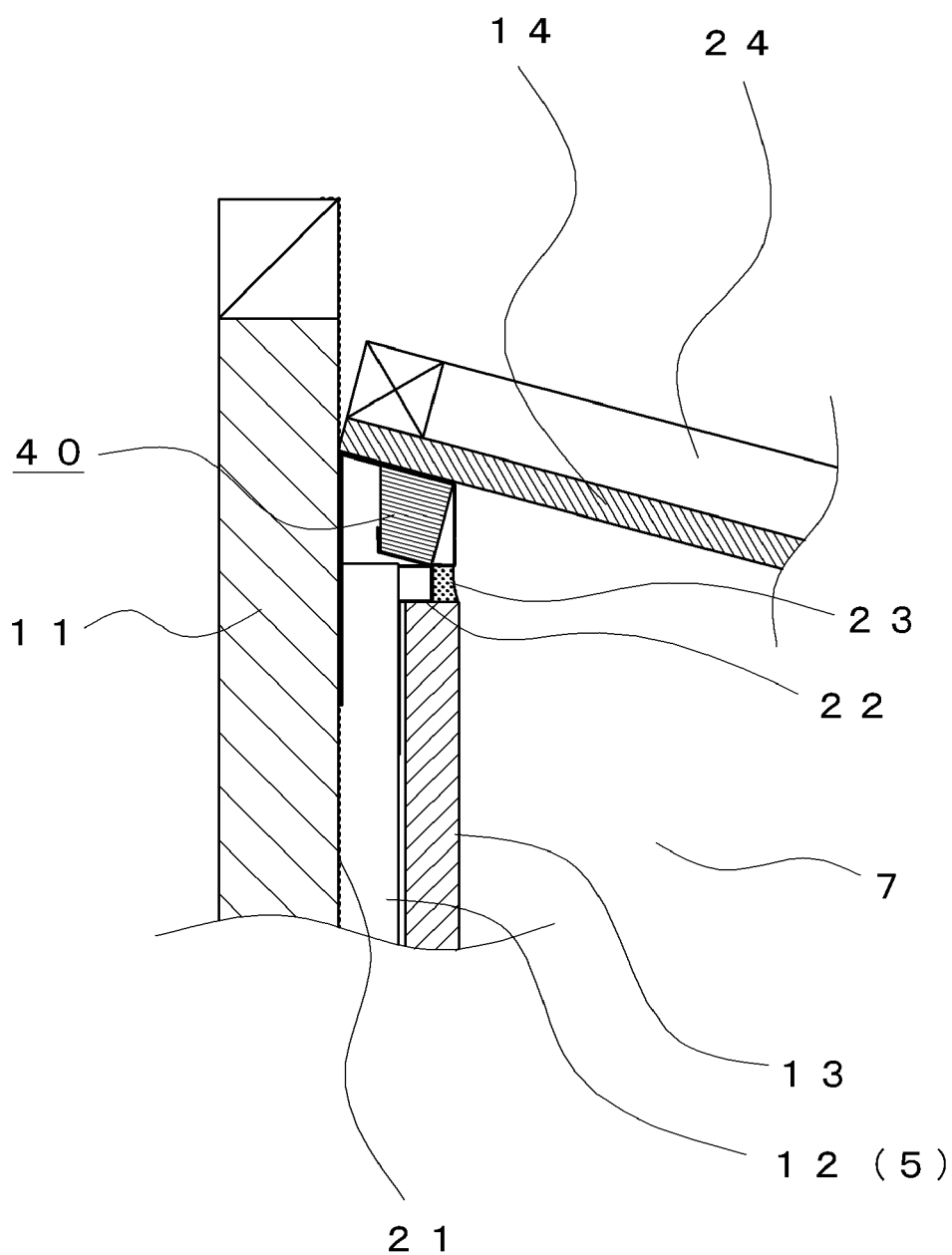
FIG. 10 is a detail drawing of a ventilation structure according to a fourth embodiment of the present invention, and corresponds to FIG. 9.
Figure 11:
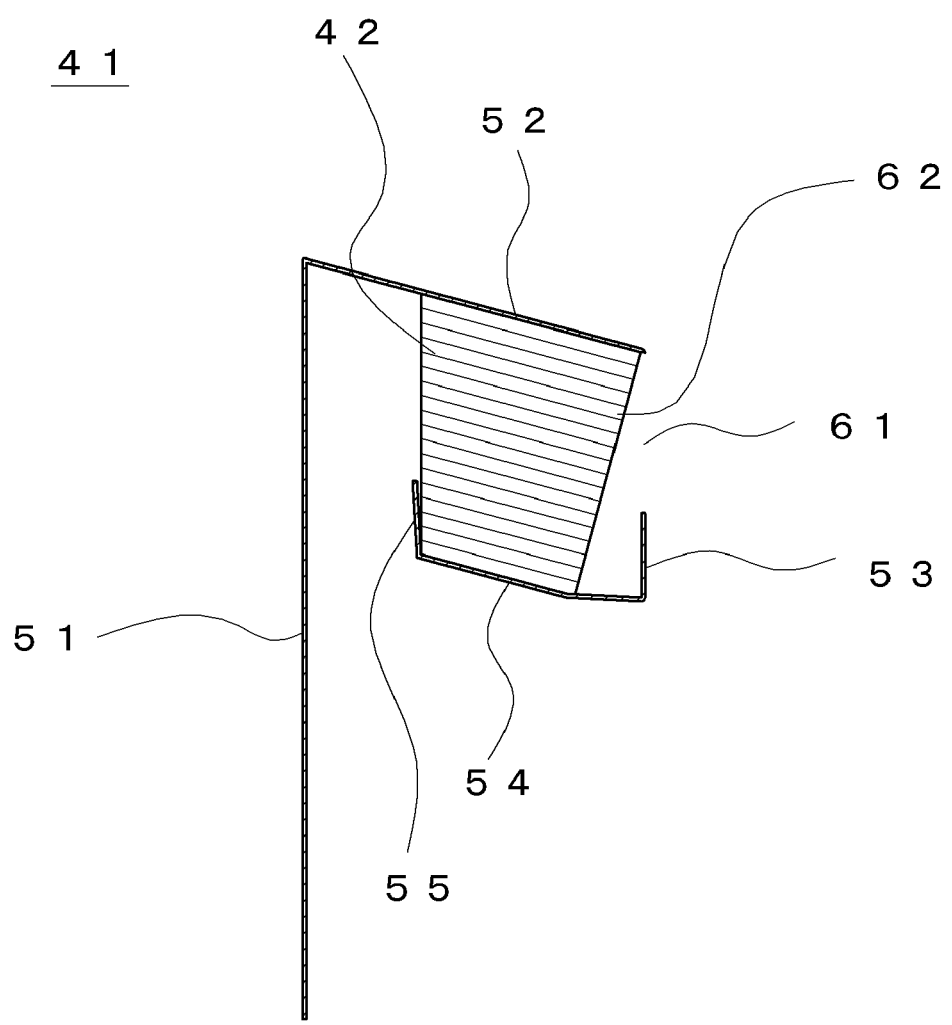
FIG. 11 is an enlarged sectional view of a ventilation member shown in FIG. 10, and corresponds to FIG. 3.

FIG. 10 is a detail drawing of a ventilation structure 1 according to a fourth embodiment of the present invention and corresponds to FIG. 9, and FIG. 11 is an enlarged sectional view of a ventilation member 40 shown in FIG. 10 and corresponds to FIG. 3.

The ventilation structure 1 according to the fourth embodiment is basically identical to that according to the third embodiment, and hence the fourth embodiment is described with reference to points different from those of the third embodiment.

Referring to FIGS. 10 and 11, a top surface portion 52 of a frame member 41 provided on the ventilation member 40 inclines and extends along an eave member 14 in the ventilation structure 1 according to the fourth embodiment.

Following this, a bottom surface portion 54 is arranged to incline to be parallel to the top surface portion 52.

Further, an aeration member 42 is also so arranged that an aeration direction of vent holes 62 is parallel to the top surface portion 52, while the bottom surface portion 54 of the frame member 41 is also sized in response to an inclining surface thereof. Therefore, the aeration member 42 has a trapezoidal sectional shape in a short-side direction.

According to this structure, the ventilation member 40 has a shape fitting an incliningly provided eave. Therefore, a clearance between the eave member 14 and the outer wall base member 11 can be reduced.

Figure 12:
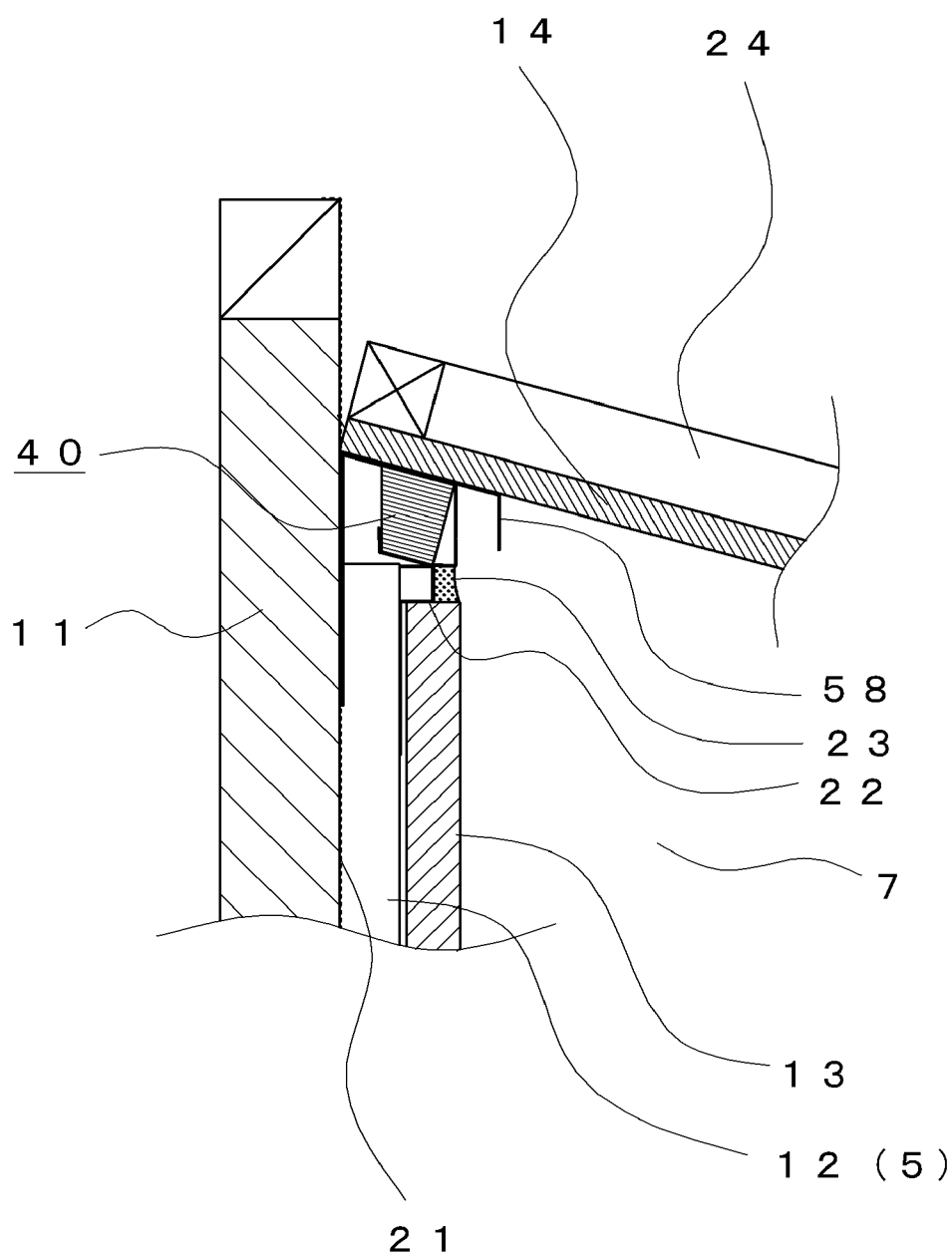
FIG. 12 is a detail drawing of a ventilation structure according to a fifth embodiment of the present invention, and corresponds to FIG. 10.

FIG. 12 is a detail drawing of a ventilation structure 1 according to a fifth embodiment of the present invention, and corresponds to FIG. 10.

The ventilation structure 1 according to the fifth embodiment is basically identical to that according to the fourth embodiment, and hence the fifth embodiment is described with reference to points different from those of the fourth embodiment.

Referring to FIG. 12, a ventilation member 40 further includes a hood member 58 in a structure similar to that according to the second embodiment.

According to this structure, openings 61 can be prevented from rainwater penetrating thereinto along an inclining eave. Thus, an effect of preventing penetration of rainwater can be improved.

While the structure of the parting portion between the outer wall member and the eave member is specified in each of the aforementioned embodiments, another structure can alternatively be employed so far as the portion is provided between the outer wall base member and the outer wall member and the eave member set upward beyond the same.

While the ventilation member is set in the ventilation structure through the single hat joiners or the like in each of the aforementioned embodiments, the present invention is not restricted to this. The ventilation member may alternatively be mounted on the structure of the parting portion between the outer wall member and the eave member by another method.

While the first vertical portion is set to be inserted into the clearance between the outer wall base member and the furring strips in the aforementioned first embodiment, the first vertical portion may alternatively be set in another mode to be directly mounted on the outer surface of the outer wall base member, for example, so far as the same is set with respect to the outer side of the upper end portion of the outer wall base member.

While the inclination angle of the top surface portion and the bottom surface portion of the frame member is 2 to 3° in the aforementioned first embodiment, the top surface portion and the bottom surface portion may alternatively be horizontalized (at an inclination angle of 0°).

While the top surface portion and the bottom surface portion are parallelly arranged in each of the aforementioned embodiments, these portions may alternatively be nonparallelly arranged. In this case, the positions of the drain holes may be varied with the inclination mode of the bottom surface portion, or the bottom surface portion may be provided with no drain holes.

While the specifically shaped openings are formed in the second vertical portion in each of the aforementioned embodiments, the openings may alternatively have another shape so far as the same can ensure a ventilation function of a ventilation structure provided under a cap piece.

While the draining is formed on the inner side of the bottom surface portion in each of the aforementioned embodiments, the bottom surface portion may alternatively be provided with no draining.

While the ventilation member is mounted on the inner surfaces of the top surface portion and the bottom surface portion with the adhesive or the double-sided adhesive tape in each of the aforementioned embodiments, the ventilation member may alternatively be mounted on these inner surfaces by another method such as fixation with screws, for example.

While the ventilation member is so mounted on the frame member as to protrude from one end of the frame member and to dent from another end thereof in the longitudinal direction in the aforementioned first embodiment, the ventilation member may alternatively be mounted on the frame member in a state entirely arranged therein.

While the size and the shape of the ventilation member are specified in each of the aforementioned embodiments, the ventilation member may alternatively have another size and another shape so far as the ventilation member exhibits ventilation and waterproof performance similar to that in each of the aforementioned embodiments and a section in a width direction has a quadrangular shape. In this case, the ventilation member preferably exhibits the same effects under the same conditions as the weather test described in the specification of Patent Document: Japanese Patent No. 2610342.

The member constituted of the first vertical portion, the top surface portion, the second vertical portion and the bottom surface portion and the eave member are independent of each other in the aforementioned second embodiment. However, the present invention is not restricted to this but these members may alternatively be integrally formed so far as the extensional portion extends outward from the connected portion between the top surface portion and the second vertical portion.

In other words, a ventilation member, set in a ventilation constitution for a parting portion between an outer wall and an eave to extend in a longitudinal direction along the parting portion, may be constituted of a frame member and an aeration member set on the frame member, the frame member may include a first vertical portion continuously extending in the longitudinal direction while extending in a first direction corresponding to a vertical direction at the time of setting in the ventilation constitution, a top surface portion connected to an upper end side of the first vertical portion to extend in a second direction with a size reaching a line of an outer surface of the outer wall at the time of setting in the ventilation constitution, a second vertical portion connected to a side of the top surface portion in the second direction to extend vertically downward and having a plurality of openings provided at prescribed intervals in the longitudinal direction, a bottom surface portion connected to a lower end side of the second vertical portion to extend toward the direction of the first vertical portion while leaving a prescribed distance, an extensional portion extending in the second direction from a connected portion between the top surface portion and the second vertical portion and a third vertical portion connected to an outer side of the extensional portion to extend vertically downward for at least partially covering the openings, and the aeration member may have an outer surface provided on the side of the openings and an inner surface provided on the side of the first vertical portion, may be mounted to be covered between an inner surface of the top surface portion and an inner surface of the bottom surface portion, and may have a plurality of vent holes facing at least the openings and passing through the aeration member from an outer surface to the inner surface.

According to this structure, opening portions are flush with the outer wall member so that the same can be prevented from rainwater penetrating thereinto along the eave when the ventilation member is set in the ventilation constitution for the parting portion between the outer wall and the eave.

When the ventilation member is set in the ventilation constitution for the parting portion between the outer wall and the eave, therefore, penetration of rainwater caused by wind-sweeping from below is so reduced that the ventilation member can be improved in effect of preventing penetration of rainwater.

Although the present invention has been described and illustrated in detail, it is clearly understood that the same is by way of illustration and example only and is not to be taken by way of limitation, the spirit and scope of the present invention being limited only by the terms of the appended claims.

What is claimed is:
1. A ventilation structure set on a parting portion between an outer wall member and an eave member to extend in a longitudinal direction along said parting portion, comprising:
   an outer wall base member;
   said outer wall member provided on said outer wall base member through a furring strip;
   said eave member provided upward beyond said outer wall member and an upper end of said furring strip; and
   a ventilation member set in a space between said outer wall base member, said furring strip, said outer wall member and said eave member for ventilating an aeration layer between said outer wall base member and said outer wall member and an exterior, wherein
   said ventilation member is constituted of:
   a frame member, and
   an aeration member set on said frame member,
   said frame member includes:
   a first vertical portion continuously extending in said longitudinal direction while extending in a vertical direction along said outer wall base member,
   a top surface portion connected to an upper end side of said first vertical portion to extend outward up to a line of an outer surface of said outer wall member,
   a second vertical portion connected to an outer side of said top surface portion to extend vertically downward and provided with a plurality of openings at prescribed intervals in said longitudinal direction, and
   a bottom surface portion connected to a lower end side of said second vertical portion to extend toward the direction of said first vertical portion while leaving a prescribed distance, and
   said aeration member is mounted to be covered between an inner surface of said top surface portion and an inner surface of said bottom surface portion and provided with a plurality of vent holes facing at least said openings and passing through said aeration member from an outer surface to an inner surface, and
   said first vertical portion is set between said upper end side of said furring strip and said outer wall base member to extend downward below said bottom surface portion in said vertical direction.

2. The ventilation structure according to claim 1, wherein said eave member is so set as to extend in a horizontal direction.

3. The ventilation structure according to claim 2, wherein said frame member further includes:
   an extensional portion extending outward from a connected portion between said top surface portion and said second vertical portion, and
   a third vertical portion connected to an outer side of the extensional portion to extend downward for at least partially covering said openings.

4. The ventilation structure according to claim 1, wherein said eave member is set to incline downward.

5. The ventilation structure according to claim 4, wherein said top surface portion incliningly extends along said eave member.

6. The ventilation structure according to claim 5, wherein said frame member further includes:
   an extensional portion extending outward from a connected portion between said top surface portion and said second vertical portion, and
   a third vertical portion connected to an outer side of the extensional portion to extend downward for at least partially covering said openings.

7. The ventilation structure according to claim 4, wherein said frame member further includes:
   an extensional portion extending outward from a connected portion between said top surface portion and said second vertical portion, and
   a third vertical portion connected to an outer side of the extensional portion to extend downward for at least partially covering said openings.

8. The ventilation structure according to claim 1, wherein said frame member further includes:
   an extensional portion extending outward from a connected portion between said top surface portion and said second vertical portion, and
   a third vertical portion connected to an outer side of the extensional portion to extend downward for at least partially covering said openings.

9. The ventilation structure according to claim 1, wherein said eave member is mounted on a ceiling joist.

10. The ventilation structure according to claim 1, further comprising a single hat joiner having a hat-shaped protrusion in said longitudinal direction,
   wherein said single hat joiner is fixed to said furring strip such that an upper surface of said hat-shaped protrusion comes into contact with said bottom surface portion of said frame member, wherein said outer wall member is mounted on said furring strip such that said upper end of said outer wall member comes into contact with a lower surface of said hat-shaped protrusion, and wherein a space between a lower surface of said bottom surface portion of said frame member, an outer surface of said hat-shaped protrusion of said single hat joiner, and said upper end of said outer wall member is filled with a caulking material.

11. A ventilation member set in a ventilation constitution for a parting portion between an outer wall and an eave to extend in a longitudinal direction along said parting portion, said ventilation constitution including an outer wall base member, said outer wall member being provided on said outer wall base member via a furring strip, said eave being provided upward beyond said outer wall member and an upper end of said furring strip, said ventilation member comprising:

a frame member; and an aeration member set on said frame member, wherein said frame member includes:

a first vertical portion continuously extending in said longitudinal direction while extending in a first direction corresponding to a vertical direction, a top surface portion connected to an upper end side of said first vertical portion to extend in a second direction with a size reaching a line of an outer surface of said outer wall, a second vertical portion connected to a side of said top surface portion in the second direction to extend vertically downward and provided with a plurality of openings at prescribed intervals in said longitudinal direction, a bottom surface portion connected to a lower end side of said second vertical portion to extend toward the direction of said first vertical portion while leaving a prescribed distance, an extensional portion extending in said second direction from a connected portion between said top surface portion and said second vertical portion, and a third vertical portion connected to an outer side of said extensional portion to extend vertically downward for at least partially covering said openings, and wherein said aeration member has an outer surface provided on the side of said openings and an inner surface provided on the side of said first vertical portion, is mounted to be covered between an inner surface of said top surface portion and an inner surface of said bottom surface portion, and has a plurality of vent holes facing at least said openings and passing through said aeration member from said outer surface to said inner surface, and wherein said first vertical portion is set between an upper end side of the furring strip and said outer wall base member to extend downward below said bottom surface portion in said first direction.

* * * * *